United States Patent
Sakai et al.

(10) Patent No.: US 12,264,407 B2
(45) Date of Patent: Apr. 1, 2025

(54) Cu—Ni—Si BASED COPPER ALLOY PLATE, Cu—Ni—Si BASED COPPER ALLOY PLATE WITH PLATING FILM, AND METHODS OF PRODUCING THE SAME

(71) Applicant: MITSUBISHI MATERIALS CORPORATION, Tokyo (JP)

(72) Inventors: Kazuaki Sakai, Aizuwakamatsu (JP); Naoki Miyashima, Aizuwakamatsu (JP); Kazunari Maki, Aizuwakamatsu (JP); Shinichi Funaki, Aizuwakamatsu (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/911,786

(22) PCT Filed: Mar. 12, 2021

(86) PCT No.: PCT/JP2021/010059
§ 371 (c)(1),
(2) Date: Sep. 15, 2022

(87) PCT Pub. No.: WO2021/187360
PCT Pub. Date: Sep. 23, 2021

(65) Prior Publication Data
US 2023/0143481 A1 May 11, 2023

(30) Foreign Application Priority Data
Mar. 19, 2020 (JP) ................................. 2020-049473

(51) Int. Cl.
*B32B 15/01* (2006.01)
*B32B 15/20* (2006.01)
(Continued)

(52) U.S. Cl.
CPC .............. *C25D 5/505* (2013.01); *B32B 15/01* (2013.01); *B32B 15/20* (2013.01); *C22C 9/06* (2013.01); *C25D 3/30* (2013.01)

(58) Field of Classification Search
None
See application file for complete search history.

(56) References Cited

U.S. PATENT DOCUMENTS

| 5,508,001 A | 4/1996 | Suzuki et al. |
| 2014/0287262 A1* | 9/2014 | Kato ...................... H01B 1/026 428/647 |

(Continued)

FOREIGN PATENT DOCUMENTS

| CN | 102482794 A | 5/2012 |
| CN | 104011236 A | 8/2014 |

(Continued)

OTHER PUBLICATIONS

Extended European Search Report issued in EP 21770856.9, mailed Nov. 8, 2023.

(Continued)

*Primary Examiner* — Mary I Omori
(74) *Attorney, Agent, or Firm* — Locke Lord LLP; James E. Armstrong, IV; Nicholas J. DiCeglie, Jr.

(57) ABSTRACT

A Cu—Ni—Si based copper alloy containing Ni and Si: in a center portion in a plate thickness direction, containing 0.4% by mass or more and 5.0% by mass or less of Ni, 0.05% by mass or more and 1.5% by mass or less of Si, and the balance Cu and inevitable impurities; where an Ni concentration on a plate surface is 70% or less of a center Ni concentration in the thickness center portion; a surface layer portion having a depth from the plate surface to be 90% of the center Ni concentration; in the surface layer portion, the Ni concentration increases from the plate surface toward the thickness center portion at 5.0% by mass/μm or more and (Continued)

100% by mass/μm or less of a concentration gradient; to improve the electric connection reliability under high-temperature environment.

11 Claims, 1 Drawing Sheet

(51) Int. Cl.
    *C22C 9/06*     (2006.01)
    *C25D 3/30*     (2006.01)
    *C25D 5/50*     (2006.01)

(56) References Cited

U.S. PATENT DOCUMENTS

2015/0000803 A1    1/2015    Kumagai et al.
2022/0081738 A1    3/2022    Miyashima et al.
2022/0316028 A1*  10/2022    Morikawa .............. C25D 5/505

FOREIGN PATENT DOCUMENTS

| | | |
|---|---|---|
| JP | H6-145847 A | 5/1994 |
| JP | 2007-314850 A | 12/2007 |
| JP | 2010-111926 A | 5/2010 |
| JP | 2010-111927 A | 5/2010 |
| JP | 2010-248593 A | 11/2010 |
| JP | 2014-005481 A | 1/2014 |
| JP | 2014-019910 A | 2/2014 |
| JP | 2014-208878 A | 11/2014 |
| TW | 201837193 A | 10/2018 |
| WO | 2011/039875 A1 | 4/2011 |
| WO | 2015/075994 A1 | 5/2015 |
| WO | 2020/137726 A1 | 7/2020 |
| WO | 2020/196791 A1 | 10/2020 |
| WO | WO-2021025071 A1 * | 2/2021 ............ B32B 15/01 |

OTHER PUBLICATIONS

Office Action issued in Taiwanese Patent Application No. TW 110109710, mailed Jul. 9, 2024.

* cited by examiner

Cu—Ni—Si BASED COPPER ALLOY PLATE, Cu—Ni—Si BASED COPPER ALLOY PLATE WITH PLATING FILM, AND METHODS OF PRODUCING THE SAME

BACKGROUND OF THE INVENTION

Technical Field

The present invention relates to a Cu—Ni—Si based copper alloy plate containing Ni and Si, a Cu—Ni—Si based copper alloy plate with a plating film that is made by plating the copper alloy plate, and manufacturing methods of them. Priority is claimed on Japanese Patent Application No. 2020-049473, filed Mar. 19, 2020, the content of which is incorporated herein by reference.

Background Art

In recent years, due to the progress of miniaturization, thinning, and weight reduction of electric devices such as mobile terminals, terminals and connector components smaller in size and have a narrow electrode pitch are used. In electronic devices used around an engine of an automobile, reliability under severe conditions at a high temperature is required. With these demands, it is required to further improve the strength, the conductivity, the spring limit value, the stress relaxation characteristic, the bending workability, the fatigue resistance and the like from the necessity of maintaining the reliability of the electrical connection, and Cu—Ni—Si based copper alloy sheets containing Ng and Si shown in Patent Literatures 1 to 3 are used.

Patent literature 1 discloses a Cu alloy for an electrical/electronic part, having a composition of Ni: 0.5 to 3%, Sn: 0.1 to 0.9%, Si: 0.08 to 0.8%, Zn: 0.1 to 3%, Fe: 0.07 to 0.25%, P: 0.001 to 0.2%, Mg: 0.001 to 0.2% by mass and the balance Cu with inevitable impurities.

Patent Literature "discloses a Cu—Ni—Si based copper alloy Sn-plated sheet and a manufacturing method thereof in which a heat-peeling resistance property of plating and a contact electric resistance are balanced at a high level. In the Cu—Ni—Si based copper alloy Sn-plated sheet, a mother material is a copper alloy plate containing 1.0 to 4.0% by mass of Ni, 0.2 to 0.9% by mass of Si, 0.3 to 1.5% by mass of Zn, 0.001 to 0.2% by mass of P, and the balance Cu with inevitable impurities; and a plating film layer that is configured of a surface Sn-phase with a thickness of 0.2 μm or less, an Sn phase with a thickness of 0.2 to 0.8 μm, an Sn—Cu alloy phase with a thickness of 0.5 to 1.4 μm, and a Cu phase with a thickness of 0 to 0.8 μm in this order from a surface to the mother material is provided.

In this Cu—Ni—Si based copper alloy Sn-plated sheet, a ratio (C/D) between a P concentration (C) in the surface Sn phase and a P concentration (D) in the base material is 1.1 to 2.0, a ratio (A/B) between a Zn concentration (A) at a boundary surface layer having a thickness 0.8 to 1.4 μm between the plating film layer and the base material and a Zn concentration (B) in the base material is 0.5 to 0.8.

Patent Literature 3 discloses a Cu—Ni—Si based copper alloy plate material for Sn plating having an excellent heat-resistance reliability. This copper alloy plate material contains Ni: 1.0 to 4.0% by mass, Si: 0.2 to 0.9% by mass and Zn: 0.7 to 2.0% by mass, in which the balance is consist of Cu and inevitable impurities, a solution treatment with recrystallization and an aging treatment are carried out, a metal Zn concentration in Auger electron spectroscopy when spattered 0.2 μm from the surface is 0.7% by mass or more.

CITATION LIST

Patent Literature

Patent Literature 1: Japanese Unexamined Patent Application, First Publication No. H06-
Patent Literature 2: Japanese Unexamined Patent Application, First Publication No. 2014-005481
Patent Literature 3: Japanese Unexamined Patent Application, First Publication No. 2010-111926

SUMMARY OF INVENTION

Problem to be Solved by the Invention

With electrification of the vehicle, sensors are being used by being installed around or directly installed on the engine of the vehicle. Terminals and connectors used around the engine of the vehicle are came to be oftener used in a higher temperature environment than even more.

Although a lot of Cu—Ni—Si based copper alloy plates which are excellent in the strength, the bending workability, the electric conductivity, the stress-relaxation characteristics and the like are invented conventionally; a Cu—Ni—Si based copper alloy plate showing sufficiently satisfied characteristic of contact electric resistance characteristic under a high temperature environment is not existed conventionally.

A lot of conventional reflow Sn plating sheets that are made by Sn plating on a conventional Cu—Ni—Si based copper alloy and carrying out a heat-melting treatment (a reflow process) are excellent in any one of characteristics such as the heat-peeling resistance, the contact electric resistance, the corrosion resistance, or a press workability. However, under a usage condition of severe high-temperature environment that is required in these days, there is no Sn-plated sheet in which the heat-peeling resistance property of plating, the contact electric resistance, and the solder wettability are balanced at the high level.

The present invention is achieved in consideration of the above circumstances, and has an object to improve the electrical connection reliability, the solder wettability, and the adhesiveness of the plating film under the high temperature environment even when a plating film of Sn or the like in a Cu—Ni—Si based copper alloy sheet containing Ni and SI.

Solution to Problem

Considering these circumstances, as a result of the earnest research, the Inventors have found that the increase in the contact electric resistance (also referred to as "contact resistance") under a high-temperature environment is caused by oxidation of Ni present on the surface of the base material, particularly, in a case in which the heat-melting treatment is carried out after Sn-plating on the base material, Ni is diffused by heating to reach the surface of the plating film, so that the increase of the contact resistance and the deterioration of the solder wettability under the high-temperature environment are significant. In this case, by alloying the base material of copper alloy with Sn, Ni is taken into the Sn—Cu alloy layer and the Sn layer, so that Ni is more easily diffused to the surface of the plating film.

Since Ni is an active element, Ni on the surface of the copper alloy plate before plating rapidly becomes Ni oxide.

In a case in which a copper alloy plate having a large amount of Ni on the surface is plated, since Ni oxide on the surface of the base material and metal in the plating film cannot form metallic bond, the adhesiveness of the plating film is deteriorated, so that the peeling under the high-temperature environment easily occurs.

Under these findings, by appropriately controlling the Ni concentration in the surface layer portion of the copper alloy plate, the oxidization of the surface of the copper alloy plate is suppressed to suppress the increase of the contact electric resistance under the high-temperature environment, and the Ni concentration in the plating film can be reduced even when the plating film is formed, the present invention intends to suppress the increase of the contact resistance, improvement of the solder wettability, and improvement of the adhesiveness under the high-temperature environment.

A Cu—Ni—Si based copper alloy plate of the present invention includes 0.4% by mass or more and 5.0% by mass or less of Ni and 0.05% by mass or more and 1.2% by mass or less of Si, and the balance Cu with inevitable impurities in a thickness center portion in a plate thickness direction; a surface Ni concentration at a plate surface is 70% or less of a center Ni concentration at the thickness center portion (also referred to as "bulk"), in a surface layer portion with a depth from the plate surface to where Ni concentration becomes 90% of the center Ni concentration, the Ni concentration increases at 5% by mass/μm or more and 100% by mass/μm or less of a concentration gradient from the plate surface toward the thickness center portion.

In other words, the Cu—Ni—Si based copper alloy plate according to the present invention is a copper alloy plate having a surface layer portion having a gradient of a Ni concentration from a plate surface in a plate thickness direction and a plate inside portion including a thickness center portion in which a Ni concentration is substantially uniform, and having components of 0.4% by mass or more and 5.0% by mass or less of Ni, 0.05% by mass or more and 1.2% by mass or less of Si, and the balance Cu and inevitable impurities in the thickness center portion. In this copper alloy plate, a surface Ni concentration at the plate surface is 0% or more and 70% or less of a center Ni concentration at the thickness center portion, and a Ni concentration in the surface layer portion increases from the plate surface toward the thickness center portion at 5% by mass/μm or more and 100% by mass/μm or less of a concentration gradient, and is highest at a deepest portion of the surface layer portion as 90% of the center Ni concentration.

In this copper alloy plate, since the surface Ni concentration is 70% or less of the center Ni concentration, accordingly the surface Ni concentration in the present invention is 3.5% by mass or less, Ni oxide is not easily generated on the plate surface, and the electrical connection reliability is excellent, so that it can be utilized as a contact point without plating treatment and the like. Preferably, the surface Ni concentration is 1.7% by mass or less.

Even in a case in which the plating film is formed thereafter and a heating treatment is carried out, it is possible to suppress Ni from diffusing into the plating film. Accordingly, the increase of the contact resistance is suppressed under the high-temperature environment, the solder wettability is excellent and the peeling of the plating film can be prevented.

In view of prevention of oxidization of the plate surface and suppress of diffusion of Ni into the plating film, the surface Ni concentration is preferably 70% or less of the center Ni concentration. Since the surface layer where the Ni concentration gradient radically changes is thin, in other words, since a thickness of the surface layer portion having the Ni concentration gradient is appropriate, the diffusion of Ni is suppressed and excellent mechanical characteristic of copper alloy is maintained.

In the surface layer portion, if the concentration gradient of Ni from the plate surface is less than 5% by mass/μm, the characteristic of suppressing the Ni diffusion to the plating film is saturated but the desired Ni concentration cannot obtained to a considerable depth since the surface layer portion with a low Ni concentration is thick, so that the characteristic as the Ni-containing copper alloy plate is impaired. On the other, if the concentration gradient of Ni exceeds 100% by mass/μm, the surface layer portion with the lower Ni concentration is too thin comparing with the thickness center portion, so that the effect of suppressing the Ni diffusion is poor.

As one aspect of the Cu—Ni—Si based copper alloy plate according to the present invention, a thickness of the surface layer portion is 0.8 μm or less. If the thickness of the surface layer portion exceeds 0.8 μm, a ratio occupied by a region in which an amount of Ni content is small in the entire plate thickness is large, so that the mechanical characteristic as the Ni-containing copper alloy may be impaired. The deterioration of the characteristic is particularly remarkable when the plate thickness is thin.

A Cu—Ni—Si based copper alloy plate according to the present invention has the above-described Cu—Ni—Si based copper alloy plate and a plating film formed on the surface layer portion.

Since the surface Ni concentration of the copper alloy plate is low and an amount of Ni oxide is small, this copper alloy plate with a plating film has an excellent adhesiveness of the plating film, Ni which diffuses into the plating film can be reduced, the increase of the contact electric resistance under the high-temperature environment can be suppressed, and the solder wettability and the heat-peeling resistance property of plating are excellent.

As one aspect of the Cu—Ni—Si based copper alloy plate with a plating film according to the present invention, an average concentration of Ni in the plating film is 10% or less of the center Ni concentration.

In this copper alloy plate with a plating film, if the average concentration of Ni in the plating film exceeds 10% of the center Ni concentration, the contact resistance by the surface diffusion of Ni is largely influenced.

In another aspect of the Cu—Ni—Si based copper alloy plate with a plating film according to the present invention, the plating film is made of one or more layers selected from tin, copper, zinc, gold, silver, palladium, and alloys of them. By using these metals or alloys as the plating film, the copper alloy plate with a plating film is excellent in the electrical connection reliability and can be appropriately used for a connector terminal.

A method of producing a Cu—Ni—Si based copper alloy plate of the present invention has a Ni concentration treatment to generate a concentration gradient of Ni in a plate thickness direction and form a Ni concentrated part where Ni is concentrated by diffusing Ni in the Ni-containing copper alloy plate toward a surface of a Cu—Ni—Si based copper alloy, and a surface portion removal treatment to form the surface layer portion by removing the Ni concentrated part where Ni is concentrated.

By this method of producing, since the surface layer portion formed by removing the Ni concentrated part has the Ni concentration lower than in the thickness center portion, an oxide film is less generated on the plate surface, and the increase of the contact electric resistance under the high-temperature environment is suppressed.

A method of producing a Cu—Ni—Si based copper alloy plate with a plating film may form the plating film by an electrolytic plating treatment with 0.1 A/dm² or more and 60 A/dm² or less of current density. If the current density during the electrolytic plating treatment is less than 0.1 A/dm², the film formation speed is low and it is not economical. If the current density exceeds 60 A/dm², it exceeds the diffusion limit current density and film having no defect cannot be formed.

For example, in a case in which a tin plating film is formed by performing the electrolytic plating treatment, a reflow process may be performed after the electrolytic plating treatment in order to suppress the occurrence of whiskers. That is, as one aspect of the method of producing the Cu—Ni—Si based copper alloy plate with a plating film, after the electrolytic plating treatment forming the plating film containing tin, a reflow process is performed with 230° C. or more and 330° C. or less of a heating peak temperature, desirably 300° C. or less, for 0.5 seconds or more and 30 seconds or less of a heating time at the heating peak temperature, desirably 1 second or more and 20 seconds or less.

If the peak heating temperature during the reflow process is less than 230° C. or the heating time is less than 0.5 seconds, tin is not remelted and an effect of suppressing the whiskers cannot be obtained. If the heating temperature exceeds 330° C. or the heating time exceeds 30 seconds, the Ni diffusion to the surface of the plating film progresses by the excessive heating, the contact resistance is increased under the high-temperature environment, and the solder wettability is deteriorated.

Advantageous Effects of Invention

According to the present invention, the oxidization of the plate surface of the Cu—Ni—Si based copper alloy is suppressed, the electrical connection reliability is improved, the Ni concentration in the plating film is reduced even when the plating film is formed, the increase of the contact resistance is suppressed under the high-temperature environment, and the solder wettability on the surface of the plating film and the adhesiveness between the plating film and the Cu—Ni—Si based copper alloy plate can be improved.

DESCRIPTION OF EMBODIMENTS

An embodiment of the present invention will be described. In a Cu—Ni—Si based copper alloy plate 1 with a plating film of this embodiment, on a plate surface 10a of a Cu—Ni—Si based copper alloy plate (hereinafter, simply referred to as "copper alloy plate") 10, a plating film 20 in which a Cu layer 21, an Sn—Cu alloy layer 22 and an Sn layer 23 are laminated in this order is formed (refer to FIG. 1).

[Copper Alloy Plate]

Figure 1:
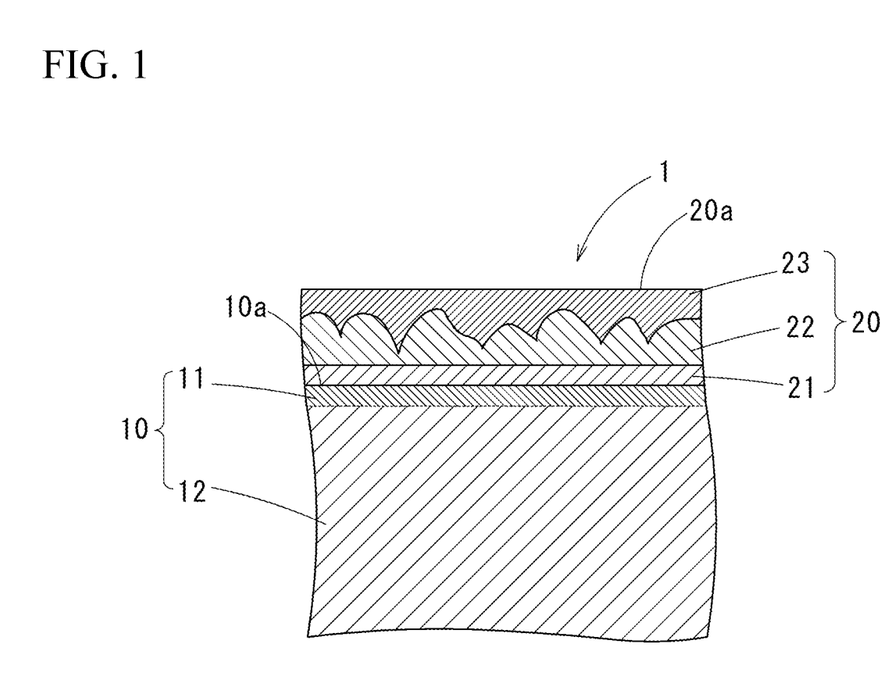
FIG. 1 It is a cross sectional view schematically showing one embodiment of a Cu—Ni—Si based copper alloy plate of the present invention.

The copper alloy plate 10 includes 0.4% by mass or more and 5.0% by mass or less of Ni and 0.05% by mass or more, 1.2% by mass or less of Si and the balance consists of Cu and inevitable impurities in a thickness center portion in a plate thickness direction.

(Ni, Si)

Ni and Si form fine particles of intermetallic compound mainly containing $Ni_2Si$ by performing appropriate heat treatment. As a result, the strength of the alloy is remarkably increased, and simultaneously, the electrical conductivity is also increased.

Ni is added in a range of 0.4% by mass or more and 5.0% by mass or less. If Ni is less than 0.4% by mass, sufficient strength cannot be obtained. If Ni exceeds 5.0%, cracking occurs in hot rolling. Preferably, Ni is 0.8% by mass or more and 4.0% by mass or less, and more preferably, Ni is 1.0% by mass or more and 3.0% by mass or less.

Si is added in a rage of 0.05% by mass or more and 1.2% by mass or less. If Si is less than 0.05%, the strength decreases. If Si exceeds 1.2% by mass, not only it does not contribute to the strength, but also the conductivity decreases due to excessive Si. Preferably, Si is 0.1% by mass or more and 1.0% by mass or less, and more preferably, Si is 0.2% by mass or more and 0.9% by mass or less.

Regarding the Ni content in the copper alloy plate 10, the Ni concentration (hereinafter referred to as "center Ni concentration") in the thickness center portion in which the Ni concentration is stable is 0.4% by mass or more and 5.0% by mass or less (preferably 1.0% by mass or more and 3.0% by mass or less), and the Ni concentration (hereinafter "surface Ni concentration") of the plate surface 10a is 70% or less (0% or more) of the center Ni concentration.

Since the surface Ni concentration of the copper alloy plate 10 is 70% or less of the center Ni concentration, Ni oxide is less likely to be generated on the plate surface 10a, and even in a case of plating and heat-treating thereafter, it is possible to suppress the diffusion of Ni into the plating film 20. Accordingly, the solder wettability is excellent and it is possible to prevent the plating film 20 from peeling off.

In view of preventing oxidization of the plate surface 10a and suppressing the Ni diffusion into the plating film 20, it is enough that the plate surface 10a does not contain Ni (the surface Ni concentration is 0% of the center Ni concentration); however, if the surface Ni concentration is 70% or less of the center Ni concentration, it is preferable since the characteristic as the Ni-containing copper alloy is given to the plate surface 10a to a certain degree. More preferably, the surface Ni concentration is 50% or less of the center Ni concentrate, more preferably 30% or less, and even more preferably 15% or less.

The Ni content in the copper alloy plate 10 has a concentration gradient of 5% by mass/μm or more and 100% by mass/μm or less from the plate surface 10a toward the center. A range from the plate surface 10a where the Ni concentration reaches 90% of the center Ni concentration due to the concentration gradient is a surface layer portion 11.

If the concentration gradient of Ni in the plate thickness direction of the copper alloy plate 10 is less than 5% by mass/μm, the desired Ni concentration cannot be obtained to a considerable depth, so that the characteristic as the Ni-containing copper alloy plate is impaired. On the other, if it exceeds 100% by mass/μm, the effect of suppressing the Ni diffusion is poor. The concentration gradient of Ni is preferably 5% by mass/μm or more and 100% by mass/μm or less, more preferably 10% by mass/μm or more and 50% by mass/μm or less, and more preferably, 15% by mass/μm or more and 40% by mass/μm or less.

The thickness of the surface layer portion 11 is preferably 0.8 μm or less, more preferably 0.5 μm or less, even more preferably 0.2 μm or less. The lower limit of the thickness is not specifically limited, but is preferably 0.01 μm or more in viewpoint of the effect of the invention. In the copper alloy plate 10, with respect to the surface layer portion 11, inside the surface layer portion 11 is defined as a plate interior 12.

Figure 2:
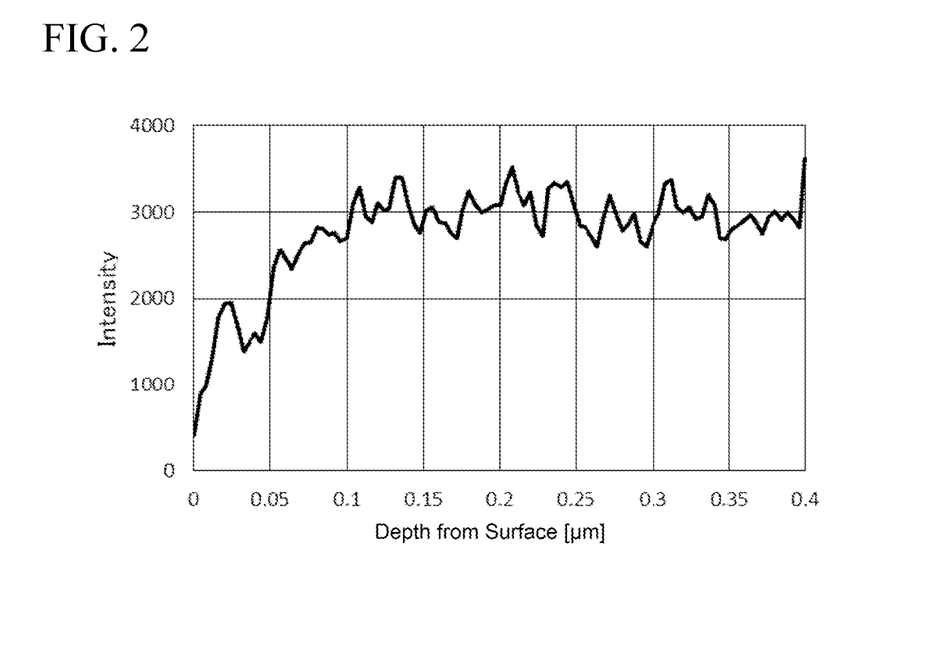
FIG. 2 It is an analysis diagram of a Ni component in a depth direction of the Cu—Ni—Si based copper alloy measured by an XPS.

FIG. 2 is a graph showing a result of analyzing the Ni component of the copper alloy plate 10 in the depth direction. A sample obtained by thinning the copper alloy plate in the plate thickness direction was analyzed by and X-ray photoelectron spectrometric device (XPS). In FIG. 2, the transverse axis shows a depth (distance) from the plate surface 10a, and the vertical axis shows a spectral intensity of XPS, i.e., the Ni concentration. An arithmetic mean value of the maximum value and the minimum value of the Ni concentration in the thickness center portion where the Ni concentration is stable is defined as the center Ni concentration in the center portion. The depth from the plate surface 10a to the position where the Ni concentration changing toward the thickness center portion first reaches 90% of the center Ni concentration is defined as the thickness of the surface layer portion 11.

(Co, Sn, Zn)

(1) the Cu—Ni—Si based copper alloy plate of the present invention can contain any one or two or more of 0.1% by mass or more and 1.0% by mass or less of Co, 0.1% by mass or more and 1.0% by mass or less of Sn, or 0.1% by mass or more and 3.0% by mass or less of Zn.

Co can form intermetallic compound by replacing Ni in $Ni_2Si$ intermetallic compound formed by a heat treatment, and improve the strength and conductivity of the alloy. If Co exceeds 1.0% by mass, the precipitate becomes coarse and the bending workability is deteriorated. If Co is less than 0.1%, the strength is not improved. Preferably, Co is 0.2% by mass or more and 0.8% by mass or less.

Sn and Zn work for improving the strength and the heat resistance; furthermore, Sn works for improving the stress-relaxation resistance and Zn works for improving the heat resistance of the solder bonding. Sn is added with a range of 0.1% by mass or more and 1.0% by mass or less, preferably 0.2% by mass or more and 0.8% by mass or less; Zn is added with a range of 0.1% by mass or more and 3.0% by mass or less, preferably 0.2% by mass or more and 0.8% by mass or less. If it is below this range, the desired effect cannot be obtained; if exceeds, the conductivity is deteriorated.

(Mg)

(2) Moreover, the Cu—Ni—Si based copper alloy of the present invention can contain 0.001% by mass or more and 0.2% by mass or less of Mg.

Mg works for improving the stress relaxing characteristic and the hot workability, but cannot affect if it is less than 0.001% by mass, or if it exceeds 0.2% by mass, the castability (deterioration of casting surface), the hot workability, a heat-peeling resistance property of plating are deteriorated. Preferably, Mg is 0.01% by mass or more and 0.15% by mass or less.

(Fe, P, C, Cr, Zr)

(3) Moreover, the Cu—Ni—Si based copper alloy plate of the present invention can contain any one or two or more of 0.007% by mass or more and 0.25% by mass or less of Fe, 0.001% by mass or more and 0.2% by mass or less of P, 0.0001% by mass or more and 0.001% by mass or less of C, 0.001% by mass or more and 0.3% by mass or less of Cr, or 0.001% by mass or more and 0.3% by mass or less of Zr, in addition to any component from (1) to (2).

Fe has effects of improving hot-rolling property (suppressing the occurrence of surface cracks and ear cracks) and improving adhesiveness of the plating film under the high-temperature environment by micronizing precipitation compound of Ni and Si. However, if the Fe content is less than 0.007% by mass, the desired effects cannot be obtained; on the other, if the content exceeds 0.25% by mass, the improving effect of the hot-rolling property is saturated and it will be a bad influence on the conductivity. Accordingly, the Fe content is decided to 0.007% by mass or more and 0.25% by mass or less. Preferably, Fe is 0.01% by mass or more and 0.2% by mass or less.

P has an effect of suppressing a decrease of in spring property caused by bending. However, if the P content is less than 0.001% by mass, the desired effect cannot be obtained; on the other, if the content exceeds 0.2% by mass, the heat-peeling resistance property of solder is impaired. Accordingly, the P content is decided to 0.001% by mass or more and 0.2% by mass or less. Preferably, P is 0.005% by mass or more and 0.1% by mass or less.

C has effects of improving press-punching property, and further, improving the strength of the alloy by micronizing the intermetallic compound of Ni and Si. However, the C content is less than 0.0001% by mass the desired effect cannot be obtained; on the other, if it exceeds 0.001% by mass, it is not preferable since it is a bad influence on the hot-working property. Accordingly, the C content is decided to 0.0001% by mass or more and 0.001% by mass or less. Preferably, C is 0.0001% by mass or more and 0.0008% by mass or less.

Cr and Zr not only have the strong affinity for C and make C easy to be contained in Cu alloy; but also have effects of improving the strength of alloy by further micronizing the intermetallic compound of Ni and Si, and further improving the strength by own precipitation. However, the content rates of Cr and/or Zr are less than 0.001% by mass, the effect of improving the strength of alloy cannot obtained; if those exceed 0.3% by mass, it is not preferable since large precipitates of Cr and/or Zr are generated, so that the plating adhesiveness is deteriorated, the press-punching property is also deteriorated, furthermore the hot-working property is impaired. Accordingly, the contents of Cr and Zr are decided respectively 0.001% by mass or more and 0.3% by mass or less. Preferably, Cr and Zr are respectively 0.01% by mass or more and 0.2% by mass or less.

[Plating Film]

The plating film 20 is configured in order of the Cu layer 21 with a thickness of 0 μm to 1 μm, the Sn—Cu alloy layer 22 with a thickness of 0.1 μm to 1.5 μm, and the Sn layer 23 with a thickness of 0.1 μm to 3.0 μm on the plate surface 10a of the copper alloy plate 10.

If the thickness of the Cu layer 21 exceeds 1 μm, thermal stress generated inside the plating film 20 increases under the high-temperature environment, so that the plating film 20 may be peeled. There is a case in which the Cu layer 21 does not exist.

The Sn—Cu alloy layer 22 is hard, and there is a risk in that the effect of reducing the insertion force when used as a connector and the strength decreases if the thickness is less than 0.1 μm. If the thickness of the Sn—Cu alloy layer 22 exceeds 1.5 μm, the thermal stress generated in the plating film 20 under the high-temperature environment increases and the plating film 20 may be peeled off.

If the thickness of the Sn layer 23 is less than 0.1 μm, the solder wettability may be decreased; if the thickness exceeds 3.0 μm, the thermal stress generated in the plating film 20 may be increased under the high-temperature environment.

The Ni concentration in the plating film 20 configured from the above-described layer structure is 10% or less (0% or more) of the center Ni concentration of the copper alloy plate 10.

If the average concentration of Ni in the plating film 20 exceeds 10% of the center Ni concentration of the copper alloy plate 10, Ni in the plating film diffuses to a plating film surface 20a, and the solder wettability may be reduced. The average concentration of Ni in the plating film 20 is preferably 5% or less of the Ni concentration at the center portion of the copper alloy plate 10, more preferably, 3% or less.

[Method of Producing]

A method of producing the Cu—Ni—Si based copper alloy plate 1 with a plating film configured as above will be described.

The Cu—Ni—Si based copper alloy plate 1 with a plating film is produced by producing a copper alloy base plate having a component composition containing 0.4 to 5.0% by mass of Ni, 0.05 to 1.2% by mass of Si, and the balance Cu and inevitable impurities (producing step of copper alloy base plate), producing a copper alloy plate by performing a surface treatment on the copper alloy base plate (surface treatment step), and then plating (plating process) and reflowing (reflow treatment process).

(Producing Step of Copper Alloy Base Plate)

The copper alloy base plate is produced by making a copper alloy ingot by melting and casting a material which is formulated into the component composition in the above-described range, and then performing steps including hot rolling, cold rolling, solution treatment, age-annealing, and finish-cold rolling in this order on the copper alloy ingot. In this embodiment, a plate thickness of the copper alloy base material is 0.2 mm.

(Surface Treatment Step)

The obtained copper alloy base plate is subjected to a surface treatment. The surface treatment has an Ni concentration treatment generating a concentration gradient of Ni in the plate thickness direction by diffusing Ni in the copper alloy base plate toward the surface of the copper alloy base plate and forming an Ni concentrated portion by concentrating Ni on the surface portion of the copper alloy base plate, and a surface portion removal treatment removing the Ni concentrated portion.

For the Ni concentration treatment, the copper alloy base plate is heated in an oxidization atmosphere such as oxygen, ozone and the like at a predetermined temperature for predetermined time. In this case, the heating treatment can be carried out at the heating temperature is 100° C. or more and within the heating time in which the recrystallization does not occur; it may be carried out at arbitrary temperature in consideration of facility constraints, economic efficiency, and the like. For example, at 350° C. for 1 minute, at 300° C. for 2 hours, or at 250° C. for 5 hours: it may be a long time for a low temperature, and a short time for a high temperature.

The oxidizing substance concentration in the oxidizing atmosphere may be, for example, 5 to 4000 ppm in the case of ozone, preferably 10 to 2000 ppm, and more preferably 20 to 1000 ppm. When oxygen is used without using ozone, an atmosphere concentration of two or more times of the case in which only ozone is used is desirable. An oxidizing substance such as ozone and oxygen may be mixed and used. Before the Ni concentration treatment, a treatment for promoting diffusion of Ni, such as introduction of strain and pores by mechanical polishing and the like, may be performed.

For the surface portion removal treatment, on the copper alloy base plate which is subjected to the Ni concentration treatment, one of or a combination of chemical polishing, electrolytic polishing, mechanical polishing and the like can be performed.

A selective etching or the like can be used for the chemical polishing. As the selective etching, for example, an etching using acid or alkaline solution containing a component which can restrain corrosion of copper, such as non-ionic surfactant, heterocyclic compound having a carbonyl group or a carboxyl group, imidazole compound, triazole compound, tetrazole compound and the like can be used.

As the electrolytic polishing, for example, an etching that is preferential on crystal grain boundaries can be used, using acid or alkaline solution as an electrolytic solution, by electrolytic on component which is easily segregated on the crystal grain boundaries of copper.

As the mechanical polishing, various methods which are generally used such as blasting, lapping, polishing, buffing, grinding, sand-paper polishing and the like can be used.

As described above, by performing the Ni concentration treatment and the surface portion removal treatment on the copper alloy base plate, the copper alloy plate 10 is formed. That is, in the copper alloy plate 10, as described above, the Ni concentration of the surface layer portion 11 is lower than the thickness center Ni concentration, and is in a state in which the Ni concentration increases with a predetermined concentration gradient from the plate surface 10a toward the center of the plate thickness direction. In addition, the center Ni concentration of the copper alloy plate 10 is substantially the same as the Ni concentration (center Ni concentration) at the thickness center part of the copper alloy base plate.

(Plating Process)

Next, a plating process is performed in order to form the plating film 20 on the plate surface 10a of the copper alloy plate 10. Stains and a natural oxidation film are removed by performing treatments such as degreasing, pickling and the like on the plate surface 10a of the copper alloy plate 10, then, a Cu-plating layer is formed by Cu plating on it, and subsequently, an Sn-plating layer is formed by performing Sn plating on the surface of the Cu-plating layer.

The Cu-plating layer and the Sn-plating layer are desirably plating layers of pure copper and pure tin respectively, however, if it is in a range which does not impair effects of the present invention, they may be a Cu-alloy plating layer and an Sn-alloy plating layer containing other elements respectively.

The respective plating layers are formed by electrolytic plating with 0.1 $A/dm^2$ or more and 60 $A/dm^2$ or less of current density. If the current density for the electrolytic plating is less than 0.1 $A/dm^2$, the film formation speed is slow and it is not economical. If the current density exceeds 60 $A/dm^2$, it exceeds the diffusion limit current density and film having no defect cannot be formed.

One example of Cu or Cu alloy plating conditions is shown.

(Cu Plating Condition)

Treatment method: electrolytic plating

Plating solution: copper sulfate plating solution

Liquid temperature: 27° C.

Current density: 4 $A/dm^2$

One example of Sn or Sn alloy plating conditions is shown.

(Sn Plating Condition)
  Treatment method: electrolytic plating
  Plating solution: tin sulfate plating solution
  Liquid temperature: 20° C.
  Current density: 2 A/dm$^2$ (Reflow Treatment Process)

Next, the copper alloy plate 10 on which these plating layers are formed is subjected to the reflow treatment maintaining at 230° C. or more and 330° C. or less of a heating peak temperature for 0.5 seconds or more and 30 seconds or less and then cooling to a temperature 60° C. or less.

By performing the reflow treatment, on the plate surface 10a of the copper alloy plate 10, the plating film 20 configured of the Cu layer 21 having a thickness of 0 μm to 1 μm, the Sn—Cu alloy layer 22 having a thickness of 0.1 μm to 1.5 μm, and the Sn layer having a thickness of 0.1 μm to 3.0 μm are formed in this order. In addition, in this reflow treatment, there is a case in which all Cu in the Cu-plating layer is alloyed with Sn in the Sn-plating layer and the Cu layer 21 is not formed.

There is a possibility that, by this reflow treatment, not only a part of Cu on the plate surface 10a of the copper alloy plate 10 diffuses to the plating film 20 and is alloyed with Sn forming the plating film 20 to form the Sn—Cu alloy layer 22, but Ni on the plate surface 10a also diffuses to the plating film 20 and is taken into the Sn—Cu alloy layer 22 and the Sn layer 23. However, since the Ni concentration of the plate surface 10a of the copper alloy plate 10 is made low, Ni taken into the plating film 10 is a small amount and the diffusion of Ni into the plating film surface 20a can be effectively suppressed.

Since the amount of Ni on the plate surface 10a of the copper alloy plate 10 is extremely small, an amount of the surface oxide is also small; and even if there is a small amount of the oxide, it can be easily removed by normal cleaning or the like before plating. Accordingly, the copper alloy plate 1 with a plating film is excellent in the adhesiveness of the plating film 20 and the copper alloy plate 10. Since the Ni oxide is not easily generated on the plating film surface 20a, the copper alloy plate 1 with a plating film is excellent in the solder wettability.

In the above embodiment, the plating film 20 is configured of the Cu layer 21, the Sn—Cu alloy layer 22, and the Sn layer 23 in this order and formed on the copper alloy plate 10, however, the plating film is not limited to this but may be configured of one or more layers selected from tin, copper, zinc, gold, silver, palladium, and alloys of them.

Example 1 an ingot of copper alloy having components shown in Table 1 was prepared, to make copper alloy base plates by a conventional method (the above-described producing step of copper alloy base plate) via hot rolling, intermediate rolling, solution treatment, aging annealing, cold rolling, or the like.

Next, the copper alloy base plate was subjected to the Ni concentration treatment by heating under the oxidization atmosphere in a range of 300 to 600° C. of a heating temperature and 1 minute to 5 hours of a heating time with varying the conditions, then the surface portion removal treatment was performed to manufacture the copper alloy plates having the various Ni concentration gradient in the surface layer portion.

Any one of the following polishing treatments was performed as the surface portion removal treatment on the copper alloy plates.

Physical polishing: buffing

Chemical polishing: immersion in a polishing liquid in which polyoxyethylene dodecyl ether was added to an aqueous solution of sulfuric acid and a hydrogen peroxide mixture Electrolytic polishing: energizing in a phosphoric acid aqueous solution using SUS304 as a counter electrode As comparative examples, samples of the copper alloy base plates on which the Ni concentration treatment and the surface portion removal treatment were not performed were made.

The Ni concentration in the plate surface and each part in the plate thickness direction of the copper ally base plates and the copper alloy plates was measured. The change in Ni concentration in the plate thickness direction of each copper alloy plate was measured from the concentration profile in the depth direction in the X-ray photoelectron spectrometric device (XPS). Measurement conditions of XPS are as follows.

(Measurement Condition)
  Pretreatment: immersed in an acetone solvent and pretreated at 38 kHz for 5 minutes using an ultrasonic cleaner
  Apparatus: X-ray photoelectron spectrometric device PHI5000 Versa Probe made by ULVAC-PHI, Inc.
  Spattering rate: 100 Å/min
  Spattering time: 100 minutes Since the depth in the XPS is a depth in terms of $SiO_2$, by comparing with data measured by TEM-EDX (energy dispersive X-ray spectroscopy) from the cross-sectional direction, the depth in terms of $SiO_2$ in the concentration profile in the XPS depth direction was converted into an actual depth.

The center Ni concentration of each copper alloy base plate was obtained by obtaining a sample in the thickness center portion where the Ni concentration is stable, measuring the maximum value and the minimum value by inductively coupled plasma atomic emission spectrometry (ICP-AES), and obtaining as an arithmetic average of them. Here, the center Ni concentration of each copper alloy plate is considered as the same as the center Ni concentration of each copper alloy base plate.

Next, the copper alloy plate with a plating film is manufactured. First, as described above, the copper alloy plates with different components and treatments were subjected to the treatments such as degreasing, pickling, and the like to remove the stains and the natural oxide film, then the Cu-plating layer was formed with the above-described Cu-plating conditions.

Next, on the copper alloy base plate that was subjected to the Cu plating and the copper alloy base plate that was not subjected to the Cu plating, the Sn-plating layer was formed with the above-described Sn-plating conditions. Then, the copper alloy plates on which these plating layers (a plating layer of a two-layer of the Cu-plating layer/Sn-plating layer, or the Sn-plating layer) were formed were subjected to the reflow treatment to manufacture the copper alloy plates with a plating film.

For the reflow treatment, the plating layer was heated to temperature in a range of 230° C. or more and 330° C. or less, and then cooled to temperature of 60° C. or less.

Then, the sample was cut out from the copper alloy plate with a plating film, and the Ni concentration in the plating film was measured. The measurement of the Ni concentration on the plating film was the same in the above-described case of copper alloy plate to obtain from the concentration profile in the depth direction from the plating film surface by XPS.

Samples of unprocessed copper alloy plates (copper alloy plates without plating film) were measured at the contact electric resistance on the surface. Samples of the copper alloy plates with a plating film were measured at the contact electric resistance on the surface, the adhesiveness of the plating film, and the solder wettability of the plating film surface.

The contact electric resistance was measured at the sample that was heated at 180° C. for 24 hours, in accordance with JIS-C-5402, and a load change-contact electric resistance from 0 g to 50 g was measured at a sliding type (distance: 1 mm) by a four-terminal contact resistance tester (CRS-113-AU, made by Yamasaki Seiki Laboratory Co. Ltd.), and the contact electric resistance value at a load 50 g was evaluated. The contact electric resistance value of less than 5 mΩ was "A", the value of 5 mΩ or more and less than 10 mΩ was "B", and the value of 10 mΩ or more was "C".

Regarding the solder wettability, in accordance with the test method of soldering (balance method) of JIS-C60068-2-69, using a solder checker (5200TN) made by Rhesca Co., Ltd., using the flux application and the soldering condition as follows, the solder wettability to each sample of lead-free solder was evaluated.

(Flux Application)
  Flux: 25% rosing-ethanol
  Flux temperature: room temperature (25° C.)
  Flux depth: 8 mm
  Flux immersion time: 5 seconds
  Drop-cutting method: the edge was brought into contact with filter paper for 5 seconds to remove the flux and fixed to the apparatus for 30 seconds
(Soldering)
  Solder composition: Sn-3.0% Ag-0.5% Cu (made by Senju Metal Industry Co., Ltd.)
  Solder temperature: 240° C.
  Solder immersion speed: 10±2.5 mm/second
  Solder immersion depth: 2 mm
  Solder immersion time: 10 seconds From the obtained load/time curve, time from start of immersion until a buoyant force by a surface tension becomes zero (i.e., a contact angle between the solder and the sample becomes 90°) was a zero-cross time (second). The solder wettability was "A" (good) if the zero-cross time was less than 2 seconds, "B" (allowed) if it was 2 seconds or more and less than 4 seconds, or "C" (not allowed) if it was 4 seconds or more.

The adhesiveness of the plating film was evaluated on the sample that was heated at 180° C. for 24 hours by a cross-cut test. The cross-cut test was performed by making cuts into the sample by a cutter knife to make 100 grids of 1 mm square, pressing a cellophane tape (#405 made by Nichiban Co., Ltd.) on the grids by a finger, and peeling the cellophane tape. After the cellophane tape was peeled off, it was "A" if the plating film was not removed, "B" if three or less of the grids were removed, or "C" if the four or more grids were removed.

Tables 3 and 4 show the evaluation results of the samples of the unprocessed material (copper alloy plates) and Tables 5 and 6 show the evaluation results of the samples of the copper alloy plates with a plating film.

In any of the tables, the center Ni concentration is a Ni concentration (% by mass) in the thickness center portion, the surface Ni concentration is a Ni concentration (% by mass) in the plate surface of the copper alloy plate in the step in which the surface portion removal treatment was performed, the bulk concentration ratio is a ratio (%) of the surface Ni concentration to the center Ni concentration, the surface layer portion thickness is a thickness from the plate surface of the copper alloy plate to the depth until the Ni concentration first reaches 90% of the center Ni concentration, and the concentration gradient is a gradient (% by mass/μm) of the Ni concentration in the surface layer portion.

The surface layer portion thickness and the concentration gradient are calculated from the concentration profile in the depth direction of the Ni component by XPS. FIG. 2 is an example of the profile: regarding the sample with the center Ni concentration is 2.0% by mass and the concentration gradient is 19% by mass/μm, in the example 1 in Table 3. The concentration gradient means a gradient of a straight line connecting a point of the surface Ni concentration and a point it first reaches 90% of the center Ni concentration in the profile.

That is, in the concentration profile in the depth direction, in a case in which the change of the Ni concentration from the plate surface to the point where it first reaches 90% of the center Ni concentration can be considered as a straight line having substantially a constant gradient even if there is a local fluctuation, the gradient of that profile is defined as the concentration gradient.

In addition, the unit of the Cu-plating layer in Tables 5 to 8 is μm; the example in which the Cu-plating treatment was not performed but only the Sn-plating treatment was performed is denoted "0" for the thickness of the Cu-plating layer. The thickness of the Sn-plating layer was made 1.0 μm in all the samples shown in Tables 5 to 8.

TABLE 1

| | | Component Composition (% by mass) | | | | | | | | | |
|---|---|---|---|---|---|---|---|---|---|---|---|
| Cu Alloy | | Ni | Si | Sn | Zn | Co | Mg | Fe | P | C | Cr | Zr |
| Example | 1 | 2.0 | 0.4 | | | | | | | | | |
| | 2 | 1.9 | 0.4 | 0.4 | 0.9 | | | | | 0.0002 | | |
| | 3 | 1.0 | 0.2 | 0.2 | 0.2 | | 0.014 | 0.007 | 0.001 | 0.0008 | | |
| | 4 | 0.4 | 0.05 | | 3.0 | | | | | | | |
| | 5 | 2.6 | 0.5 | | | | 0.001 | | | 0.0001 | | |
| | 6 | 3.0 | 0.7 | 1.0 | | 0.2 | | | | | | 0.001 |
| | 7 | 4.0 | 0.9 | 0.1 | 0.1 | | | | | 0.001 | | |
| | 8 | 5.0 | 1.2 | | | | | | | | | |
| | 9 | 0.8 | 0.4 | | | 1.0 | | | 0.005 | | | |
| | 10 | 2.1 | 0.3 | 0.8 | 1.0 | | 0.005 | | | | | |
| | 11 | 1.8 | 0.4 | | 0.1 | | | 0.25 | 0.2 | | | |
| | 12 | 2.9 | 0.4 | | 1.2 | 0.8 | | | | | | 0.001 |

TABLE 1-continued

| Cu Alloy | Component Composition (% by mass) | | | | | | | | | |
|---|---|---|---|---|---|---|---|---|---|---|
| | Ni | Si | Sn | Zn | Co | Mg | Fe | P | C | Cr | Zr |
| 13 | 1.7 | 0.5 | | | 0.4 | | | | | 0.3 | |
| 14 | 1.5 | 0.4 | 0.6 | | | 0.2 | | | | | 0.3 |

TABLE 2

| Cu Alloy | | Component Composition (% by mass) | | | | | | | | | |
|---|---|---|---|---|---|---|---|---|---|---|---|
| | | Ni | S | Sn | Zn | Co | Mg | Fe | P | C | Cr | Zr |
| Comparative Example | 1 | 1.9 | 0.4 | 0.3 | | | | | | | | |
| | 2 | 1.4 | 0.3 | 0.7 | 0.4 | | | | | | | |
| | 3 | 5.8 | 1.3 | | | | | | | | | |
| | 4 | 3.5 | 0.8 | 0.9 | 0.5 | | | | | | | |
| | 5 | 1.5 | 0.02 | | | 0.6 | | | | | | |
| | 6 | 2.2 | 0.5 | | | | | | | | | |

TABLE 3

| | | Center Ni Concentration (% by mass) | Concentration Gradient (% by mass/μm) | Removal Method | Surface Ni Concentration (% by mass) | Bulk Concentration Ratio (%) | Surface Layer Portion Thickness (μm) | Contact Resistance |
|---|---|---|---|---|---|---|---|---|
| Example | 1 | 2.0 | 19 | Physical Polishing | 0.28 | 13.8 | 0.080 | A |
| | 2 | 1.9 | 9 | | 0.03 | 1.6 | 0.187 | A |
| | 3 | 1.0 | 38 | | 0.00 | 0.0 | 0.024 | A |
| | 4 | 0.4 | 16 | | 0.00 | 0.0 | 0.023 | A |
| | 5 | 2.6 | 12 | | 1.61 | 61.9 | 0.061 | B |
| | 6 | 3.0 | 58 | | 0.14 | 4.7 | 0.044 | A |
| | 7 | 4.0 | 7 | | 1.43 | 35.8 | 0.310 | B |
| | 8 | 5.0 | 5 | Chemical Polishing | 0.50 | 10.0 | 0.800 | A |
| | 9 | 0.8 | 11 | | 0.13 | 16.3 | 0.054 | A |
| | 10 | 2.1 | 15 | | 1.46 | 69.5 | 0.029 | B |
| | 11 | 1.8 | 46 | | 0.00 | 0.0 | 0.035 | A |
| | 12 | 2.9 | 5 | Electrolytic Polishing | 0.00 | 0.0 | 0.522 | A |
| | 13 | 1.7 | 100 | | 0.06 | 3.5 | 0.015 | A |
| | 14 | 1.5 | 16 | | 0.70 | 46.7 | 0.041 | B |

TABLE 4

| | | Center Ni Concentration (% by mass) | Concentration Gradient (% by mass/μm) | Removal Method | Surface Ni Concentration (% by mass) | Bulk Concentration Ratio (%) | Surface Layer Portion Thickness (μm) | Contact Resistance |
|---|---|---|---|---|---|---|---|---|
| Comparative Example | 1 | 1.9 | ∞ (unprocessed) | — | 1.88 | 98.9 | 0.000 | C |
| | 2 | 1.4 | 82 | Chemical Polishing | 1.08 | 77.1 | 0.002 | C |
| | 3 | 5.8 | 74 | Electrolytic Polishing | 5.24 | 90.3 | 0.000 | C |
| | 4 | 3.5 | 88 | | 3.09 | 88.3 | 0.001 | C |
| | 5 | 1.5 | ∞ (unprocessed) | — | 1.50 | 100.0 | 0.000 | C |
| | 6 | 2.2 | 110 | Physical Polishing | 1.16 | 52.7 | 0.007 | C |

TABLE 5

| | Center Ni Concentration (% by mass) | Concentration Gradient (% by mass/μm) | Removal Method | Surface Ni Concentration (% by mass) | Bulk Concentration Ratio (%) | Surface Layer Portion Thickness (μm) | Cu Plating |
|---|---|---|---|---|---|---|---|
| Example 1 | 2.0 | 19 | Physical Polishing | 0.28 | 13.8 | 0.080 | 0 |
| | | | | | | | 1.0 |
| 2 | 1.9 | 9 | | 0.03 | 1.6 | 0.187 | 0 |
| | | | | | | | 1.0 |
| 3 | 1.0 | 38 | | 0.00 | 0.0 | 0.024 | 0 |
| | | | | | | | 1.0 |

TABLE 5-continued

| | Center Ni Concentration (% by mass) | Concentration Gradient (% by mass/μm) | Removal Method | Surface Ni Concentration (% by mass) | Bulk Concentration Ratio (%) | Surface Layer Portion Thickness (μm) | Cu Plating |
|---|---|---|---|---|---|---|---|
| 4 | 0.4 | 16 | | 0.00 | 0.0 | 0.023 | 0 / 1.0 |
| 5 | 2.6 | 12 | | 1.61 | 61.9 | 0.061 | 0 / 1.0 |
| 6 | 3.0 | 58 | | 0.14 | 4.7 | 0.044 | 0 / 1.0 |
| 7 | 4.0 | 7 | | 1.43 | 35.8 | 0.310 | 0 / 1.0 |
| 8 | 5.0 | 5 | Chemical Polishing | 0.50 | 10.0 | 0.800 | 0 / 1.0 |
| 9 | 0.8 | 11 | | 0.13 | 16.3 | 0.054 | 0 / 1.0 |
| 10 | 2.1 | 15 | | 1.46 | 69.5 | 0.029 | 0 / 1.0 |
| 11 | 1.8 | 46 | | 0.00 | 0.0 | 0.035 | 0 / 1.0 |
| 12 | 2.9 | 5 | Electrolytic Polishing | 0.00 | 0.0 | 0.522 | 0 / 1.0 |
| 13 | 1.7 | 100 | | 0.06 | 3.5 | 0.015 | 0 / 1.0 |
| 14 | 1.5 | 16 | | 0.70 | 46.7 | 0.041 | 0 / 1.0 |

TABLE 6

| | | Contact Resistance | Adhesiveness of Plating Film | Solder Wettability |
|---|---|---|---|---|
| Example | 1 | A / A | A / A | A / A |
| | 2 | A / A | A / A | A / A |
| | 3 | A / A | A / A | A / A |
| | 4 | A / A | A / A | A / A |
| | 5 | B / A | B / A | B / A |
| | 6 | B / A | A / A | A / A |
| | 7 | B / A | B / A | B / A |
| | 8 | A | B | A |
| | 9 | A / A | A / A | A / A |
| | 10 | B / B | B / A | A / A |
| | 11 | B / A | A / A | A / A |
| | 12 | A / A | A / A | A / A |
| | 13 | B / A | A / A | A / A |
| | 14 | B / A | A / A | A / A |

TABLE 7

| | | Center Ni Concentration (% by mass) | Concentration Gradient (% by mass/μm) | Removal Method | Surface Ni Concentration (% by mass) | Bulk Concentration Ratio (%) | Surface Layer Portion Thickness (μm) | Cu Plating |
|---|---|---|---|---|---|---|---|---|
| Comparative Example | | 1.9 | ∞ (unprocessed) | — | 1.88 | 98.9 | 0.000 | 0 / 1.0 |
| | 2 | 1.4 | 82 | Chemical Polishing | 1.08 | 77. | 0.002 | 0 / 1.0 |
| | 3 | 5.8 | 74 | Electrolytic Polishing | 5.24 | 90.3 | 0.000 | 0 / 1.0 |
| | 4 | 3.5 | 88 | | 3.09 | 88.3 | 0.001 | 0 / 1.0 |
| | 5 | 1.5 | ∞ (unprocessed) | — | 1.50 | 100.0 | 0.000 | 0 / 1.0 |
| | 6 | 2.2 | 110 | Physical Polishing | 1.16 | 52.7 | 0.007 | 0 / 1.0 |

TABLE 8

| | | Contact Resistance | Adhesiveness of Plating Film | Solder Wettability |
|---|---|---|---|---|
| Comparative Example | 1 | C | C | C |
| | | C | C | C |
| | 2 | C | C | C |
| | | B | C | B |
| | 3 | C | C | C |
| | | C | C | C |
| | 4 | C | C | C |
| | | C | C | C |
| | 5 | C | C | C |
| | | C | C | C |
| | 6 | C | C | B |
| | | B | C | B |

Regarding the unprocessed material of the copper alloy plates shown in Tables 3 and 4, the contact resistance of the examples in which the surface Ni concentration (bulk concentration ratio) was relatively high (Examples 5, 7, 10, and 14) in Table 3 was "B" resulting in larger than the other examples (the contact resistance was "□").

In Comparative Examples in Table 4, the contact resistance of Comparative Examples 1 to 5 in which the bulk concentration ratio exceed 70% was "C". In Comparative Example 6, although the bulk concentration ratio was less than 70%, since the Ni concentration gradient exceeded 100% by mass/μm, it is considered that the contact electric resistance became large after heating to be "C".

Regarding the copper alloy plates with a plating film shown in Tables 5 to 8, in the examples in Tables 5 and 6, in ones in which the Ni concentration gradient was large (Examples 6, 11, and 13) and ones in which the bulk concentration ratio of the surface Ni concentration was large (Examples 5, 7, 10, and 14), either one of the evaluation results was "B". Particularly, in samples in which the Cu plating was not performed (0 μm) when the plating layers were formed but only the Sn plating was performed, this tendency was remarkable.

Regarding Comparative Examples in Tables 7 and 8, in Comparative Examples 1 and 5 in which the Ni concentration treatment and the surface portion removal treatment were not performed ("concentration gradient" was "∞ (unprocessed)") and Comparative Examples 3 and 4 in which the center Ni concentration was high and the bulk concentration ratio largely exceeded 70%, the contact resistance, the solder adhesiveness, and the solder wettability were bad. Regarding Comparative Examples 2 and 6, the results of the contact resistance and the solder wettability were better in ones in which the Cu plating 1.0 μm than the others; however, since the bulk concentration ratio of Comparative Example 2 and the Ni concentration gradient of Comparative Example 6 exceeded the range of the present invention, the adhesiveness was bade even if the plating film was formed.

Example 2

After making the copper alloy plates having the various Ni concentration gradient from the copper alloy base plates with the center Ni concentration was 2.0% and the Si concentration was 0.4% by mass, by the same method as in Example 1, then the copper alloy plates with a plating film were made by performing the plating treatment on the copper alloy plates by the same method in Example 1, and the Ni concentration in the Sn-plating layer in the copper alloy plates with a plating film was measured by XPS with the same condition as in Example 1. The ratio (bulk concentration ratio) to the center Ni concentration of the Ni concentration in the Sn-plating layer of the copper alloy plates with a plating film and the solder wettability were checked. The result is shown in Table 9.

TABLE 9

| | | Center Ni Concentration (% by mass) | Thickness of Cu Plating (μm) | Concentration Gradient (% by mass/μm) | Ni Concentration in Plating (Bulk Concentration Ratio %) | Solder Wettability |
|---|---|---|---|---|---|---|
| Example | 16 | 2.0 | 1.0 | 5 | 0.1 | A |
| | 17 | | | 11 | 0.3 | A |
| | 18 | | | 25 | 0.4 | A |
| | 19 | | | 37 | 0.9 | A |
| | 20 | | | 46 | 3.9 | A |
| | 21 | | | 54 | 6.9 | B |
| | 22 | | | 93 | 8.8 | B |
| Comparative Example | 7 | | | 112 | 10.9 | C |

As shown in Table 9, in the sample (Comparative Example 7) in which the Ni concentration gradient exceeded 100% by mass/μm, the Ni concentration in the Sn-plating layer exceeded 10% by the bulk concentration ratio and the solder wettability was deteriorated.

Example 3

Samples having 25% by mass/μm of the Ni concentration gradient were made from the copper alloy base plate having 2.0% by mass of the center Ni concentration and 0.4% by mass of Si concentration by the same method as in Example 1. When they were made, by changing the removal amount of the surface portion in the surface part removal treatment, the copper alloy plates in which the concentration gradient was the same but the surface Ni concentration was different were obtained.

The copper alloy plates with a plating film were manufactured by performing the plating treatment by the same method as in Example 1 on the manufactured copper alloy plates, and the plating adhesiveness and the solder wettability of the copper alloy plates with a plating film were measured. The result is shown in Tables 10 and 11. "Bulk concentration ratio" in Table 10 is a ratio of the surface Ni concentration to the center Ni concentration in the copper alloy plate, similarly to Example 1.

TABLE 10

| | Center Ni Concentration (% by mass) | Concentration Gradient (% by mass/μm) | Surface Ni Concentration | Bulk Concentration Ratio [%] | Cu Plating Thickness (μm) |
|---|---|---|---|---|---|
| Example 23 | 2.0 | 25 | 0.00 | 0.0 | 0 |
| | | | | | 1.0 |
| 24 | | | 0.29 | 14.5 | 0 |
| | | | | | 1.0 |
| 25 | | | 0.56 | 28.0 | 0 |
| | | | | | 1.0 |
| 26 | | | 1.34 | 67.0 | 0 |
| | | | | | 1.0 |
| Comparative Example 8 | | | 1.61 | 80.5 | 0 |
| | | | | | 1.0 |

TABLE 11

| | | Contact Resistance | Adhesiveness | Solder Wettability |
|---|---|---|---|---|
| Example | 23 | A | A | A |
| | | A | A | A |
| | 24 | A | A | A |
| | | A | A | A |
| | 25 | A | A | B |
| | | A | B | A |
| | 26 | B | B | B |
| | | B | B | B |
| Comparative Example | 8 | C | C | C |
| | | C | C | C |

As shown in Tables 10 and 11, in the sample (Comparative Example 8) in which the bulk concentration ratio exceeded 70%, the contact electrical resistance, the plating adhesiveness, and the solder wettability were deteriorated after heating.

Example 4

By the same method as in Example 1, the copper alloy plates (unprocessed material) in which the center Ni concentration was 2.0% by mass and the Si concentration was 0.4% by mass and the various Ni concentration gradients in the surface layer portion and the surface Ni concentration was adjusted to 0% by mass were manufactured and the various metal plating layers were formed only one layer. Only plating was performed and reflow was not performed for this Example.

Metal types of the plating layers were Sn, Cu, Zn, Au, Ag, and Pd. Plating current density was 3 A/dm$^2$ for all and the thickness of the plating film was 1 μm. Although any of generally used acid, neutral, or alkaline bath can be used for the plating baths, the acid bath was used for Sn, Cu, Zn and Pd, and the alkaline bath was used for Au and Ag in this Example.

The samples manufacture by the above steps were evaluated after heating at the contact resistance, the solder wettability, and the adhesiveness of the plating film. The evaluation method and the judging method are the same as in Example 1. The evaluation result is shown in Tables 12 and 13.

TABLE 12

| Center Ni Concentration (% by mass) | Surface Layer Portion Thickness (μm) | Concentration Gradient (% by mass/μm) | Removal Method | Plating Type | Contact Resistance | Adhesiveness of Plating Film | Solder Wettability |
|---|---|---|---|---|---|---|---|
| 2.0 | 0.095 | 19 | Physical Polishing | Sn | A | A | A |
| | 0.075 | 24 | | Cu | A | A | A |
| | 0.106 | 17 | | Zn | A | A | A |
| | 0.047 | 38 | | Au | A | A | A |
| | 0.058 | 31 | | Ag | A | A | A |
| | 0.064 | 28 | | Pd | A | A | A |

TABLE 13

| Center Ni Concentration (% by mass) | Surface Layer Portion Thickness (μm) | Concentration Gradient (% by mass/μm) | Removal Method | Plating Type | Contact Resistance | Adhesiveness of Plating Film | Solder Wettability |
|---|---|---|---|---|---|---|---|
| 2.0 | — | ∞ (unprocessed) | — | Sn | C | C | A |
| | | | | Cu | C | C | A |
| | | | | Zn | C | C | A |
| | | | | Au | A | C | A |
| | | | | Ag | C | C | A |
| | | | | Pd | B | C | A |

As shown in Table 12 and 13, the solder wettability was good in both Example shown in Table 12 and Comparative Example shown in Table 13; however, in the sample in which the Ni concentration gradient exceeds 100% by mass/μm shown in Comparative Example of Table 13, the plating film was peeled off after heating.

In addition, although the plating film made of only one-layer of the plating layer (Sn-plating layer) is included in the above described examples, the plating film structure may be a multi-layer of plating layer; moreover, various metals are alloyed by treatment such as heating in order to reduction of costs, further improvement of characteristics, and the like.

For example, in a combination of the Cu-plating layer and a pure-Sn plating layer, in a case in which the reflow treatment cannot be performed due to some reason of characteristic, an alloy layer that is not intended may be formed over time between the pure-tin plating layer and copper of the base (copper alloy plate or Cu-plating layer).

There is a risk that whiskers may be generated due to plating inner stress and the like resulted from the alloy layer, so that the Sn-plating layer may be an alloy plating layer of Sn with Cu, Ag or the like in order to suppress the whiskers.

INDUSTRIAL APPLICABILITY

In a Cu—Ni—Si based copper alloy plate, it is possible to suppress oxidization of a the plate surface and improve the electric connection reliability, and moreover, in a case in which a plating film is provided, the electric connection reliability of the surface of the plating film, the adhesiveness between the plating film and the copper alloy plate, and the solder wettability of the surface of the plating film can be improved.

REFERENCE SIGNS LIST

1 Cu—Ni—Si based copper alloy plate with plating film
10 Copper alloy plate (Cu—Ni—Si based copper alloy plate)
10a Plate surface
11 Surface layer portion
12 Plate interior
20 Plating film
20a Plating film surface
21 Cu layer
22 Sn—Cu alloy layer
23 Sn layer

The invention claimed is:

1. A Cu—Ni—Si based copper alloy plate comprising 0.4% by mass or more and 5.0% by mass or less of Ni, 0.05% by mass or more and 1.2% by mass or less of Si, and the balance Cu with inevitable impurities in a thickness center portion in a plate thickness direction; wherein
a surface Ni concentration at a plate surface is 70% or less of a center Ni concentration at the thickness center portion,
in a surface layer portion with a depth from the plate surface to where a Ni concentration becomes 90% of the center Ni concentration, the Ni concentration increases at 5% by mass/μm or more and 100% by mass/μm or less of a concentration gradient from the plate surface toward the thickness center portion.

2. The Cu—Ni—Si based copper alloy plate according to claim 1, wherein a thickness of the surface layer portion is 0.8 μm or less.

3. The Cu—Ni—Si based copper alloy plate according to claim 1 further containing any one or two or more of
0.1% by mass or more and 1.0% by mass or less of Co,
0.1% by mass or more and 1.0% by mass or less of Sn, and
0.1% by mass or more and 3.0% by mass or less of Zn in the thickness center portion.

4. The Cu—Ni—Si based copper alloy plate according to claim 1 further containing 0.001% by mass or more and 0.2% by mass or less of Mg in the thickness center portion.

5. The Cu—Ni—Si based copper alloy plate according to claim 1 further containing any one or two or more of
0.007% by mass or more and 0.25% by mass or less of Fe,
0.001% by mass or more and 0.2% by mass or less of P,
0.0001% by mass or more and 0.001% by mass or less of C,
0.001% by mass or more and 0.3% by mass or less of Cr, and
0.001% by mass or more and 0.3% by mass or less of Zr in the thickness center portion.

6. A Cu—Ni—Si based copper plate with a plating film, comprising
the Cu—Ni—Si based copper alloy plate according to claim 1, and
the plating film on the surface layer portion of the Cu—Ni—Si based copper alloy plate.

7. The Cu—Ni—Si based copper alloy plate with the plating film according to claim 6, wherein an average concentration of Ni in the plating film is 10% or less of the center Ni concentration.

8. The Cu—Ni—Si based copper alloy plate with the plating film according to claim 6, wherein the plating film is made of one or more layers selected from tin, copper, zinc, gold, silver, palladium, and alloys thereof.

9. A method of producing a Cu—Ni—Si based copper alloy plate with the plating film producing the Cu—Ni—Si based copper alloy with the plating film according to claim 6, wherein
the plating film is formed by an electrolytic plating treatment with 0.1 A/dm$^2$ or more and 60 A/dm$^2$ or less of current density.

10. The method of producing the Cu—Ni—Si based copper alloy plate with the plating film according to claim 9, wherein after the electrolytic plating treatment forming the plating film containing tin, a reflow process is performed at 230° C. or more and 330° C. or less of a heating peak temperature for 0.5 seconds or more and 30 seconds or less of a heating time at the heating peak temperature.

11. A method of producing the Cu—Ni—Si based copper alloy plate according to claim 1, comprising
a Ni concentration treatment to generate the concentration gradient of Ni in the plate thickness direction and form a surface portion where Ni is concentrated by diffusing Ni in the Cu—Ni—Si based copper alloy plate toward a surface of the Cu—Ni—Si based copper alloy, and
a surface portion removal treatment to form the surface layer portion by removing the surface portion where Ni is concentrated.

* * * * *